United States Patent
Adams et al.

(10) Patent No.: US 8,291,215 B2
(45) Date of Patent: *Oct. 16, 2012

(54) SYSTEM AND METHOD FOR PROCESSING CERTIFICATES LOCATED IN A CERTIFICATE SEARCH

(75) Inventors: Neil P. Adams, Waterloo (CA); Herbert A. Little, Waterloo (CA); Michael K. Brown, Kitchener (CA); Michael S. Brown, Waterloo (CA); Michael G. Kirkup, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1151 days.

This patent is subject to a terminal disclaimer.

(21) Appl. No.: 11/417,108

(22) Filed: May 4, 2006

(65) Prior Publication Data

US 2007/0260874 A1    Nov. 8, 2007

(51) Int. Cl.
*G06F 21/00* (2006.01)
(52) U.S. Cl. ............ 713/156; 713/2; 713/151; 713/172; 709/223; 455/411
(58) Field of Classification Search .................. 713/151, 713/155, 156, 176
See application file for complete search history.

(56) References Cited

U.S. PATENT DOCUMENTS

| | | | |
|---|---|---|---|
| 6,185,678 B1 * | 2/2001 | Arbaugh et al. ................... | 713/2 |
| 6,981,148 B1 * | 12/2005 | Jim et al. ....................... | 713/175 |
| 2002/0053023 A1 * | 5/2002 | Patterson et al. ............. | 713/156 |
| 2002/0156879 A1 * | 10/2002 | Delany et al. ................ | 709/223 |
| 2004/0019790 A1 * | 1/2004 | Aono et al. .................... | 713/172 |
| 2004/0186989 A1 * | 9/2004 | Clapper ........................ | 713/151 |
| 2005/0114666 A1 | 5/2005 | Sudia | |
| 2005/0191990 A1 * | 9/2005 | Willey et al. .................. | 455/411 |
| 2005/0278534 A1 | 12/2005 | Nadalin et al. | |

(Continued)

FOREIGN PATENT DOCUMENTS

CA     1632871     *  9/2004

(Continued)

OTHER PUBLICATIONS

LAN/MAN Standards committee, "Wireless LAN Medium Access Control(MAC) and Physical Layer(PHY) Specifications", IEEE Computer Society, Feb. 2, 2011.*

(Continued)

*Primary Examiner* — Taghi Arani
*Assistant Examiner* — Gregory Lane
(74) *Attorney, Agent, or Firm* — Bereskin & Parr LLP/S.E.N.C.R.L., s.r.l.

(57) ABSTRACT

A system and method for processing certificates located in a certificate search. Certificates located in a certificate search are processed at a data server (e.g. a mobile data server) coupled to a computing device (e.g. a mobile device) to determine status data that can be used to indicate the status of those certificates to a user of the computing device, without having to download those certificates to the computing device in their entirety. The data server is further adapted to transmit the status data to the computing device. In one embodiment, at least one status property of the certificates is verified at the data server in determining the status data. In another embodiment, additional certificate data is determined and transmitted to the computing device, which can be used by the computing device to verify, at the computing device, at least one other status property of the certificates.

19 Claims, 7 Drawing Sheets

U.S. PATENT DOCUMENTS

2007/0260877 A1 11/2007 Adams et al.

FOREIGN PATENT DOCUMENTS

| CA | 1633100 | * | 3/2006 |
|----|---------|---|--------|
| EP | 1-632-871 A1 | | 3/2006 |
| EP | 1-633-100 A1 | | 3/2006 |
| EP | 1-653-696 A1 | | 5/2006 |
| EP | 1852800 | | 11/2007 |
| EP | 1852801 | | 11/2007 |
| WO | WO 03/079627 A2 | | 9/2003 |
| WO | WO-03/079627 A3 | | 9/2003 |
| WO | WO03079627 | * | 9/2003 |

OTHER PUBLICATIONS

CertAgent On-Line Help System Retrieved from the Internet http://ca1.infoseccorp.com/certagent/help_public/content.htm.
Online Certificate Status Protocol (OCSP). Retrieved from the Internet http://cisco.com/en/US/products/sw/iosswrel/ps5207/products_feature_guide09186a00801a755b.html.
Corradi, Antonio et al. "A Flexible Management Framework for Certificate Status Validation" Retrieved from the Internet. http://security.polito.it/doc/pub/m_framew.pdf.
European Search Report. Application No. 06113481.3 Dated: Nov. 16, 2006.
European Search Report Application No. 06115690.7 Dated: Nov. 16, 2006.
Risvan Coskun, Wireless E-mail Security: A State-of-the-Art Review for Message Privacy and Proptection from Application Perspective, 2004, 8 pages.
Research in Motion Limited, BlackBerry Security with the S/MIME Support Package version 1.5, 2003.
Co-pending U.S. Appl. No. 11/455,180, "Updating Certificate Status in a System and Method for Processing Certificates Located in a Certificate Search", Filed Jun. 19, 2006.
United States Office Action. Co-pending U.S. Appl. No. 11/455,180. Dated: Aug. 7, 2009.
European Examination Report. Application No. 06113481.3. Dated: Feb. 10, 2009.
European Examination Report. Application No. 06115690.7. Dated: Feb. 13, 2008.
Amendment. Co-pending U.S. Appl. No. 11/455,180. Dated: Jan. 7, 2010.
Final Office Action. Co-pending U.S. Appl. No. 11/455,180. Dated: Apr. 8, 2010.
Canadian First Office Action. Application No. 2,587,306. Dated: Mar. 19, 2010.
Amendment. Co-pending U.S. Appl. No. 11/455,180. Dated: Jul. 7, 2010.
Request for Continued Examination (RCE). Co-pending U.S. Appl. No. 11/455,180. Dated: Jul. 7, 2010.
Canadian First Office Action. Application No. 2,587,232. Dated: Nov. 29, 2010.
Office Action. U.S. Appl. No. 11/455,180. Dated: Jul. 7, 2011.
Amendment. U.S. Appl. No. 11/455,180. Dated: Oct. 4, 2011.
Summons to Attend Oral Proceedings Pursuant to Rule 115(1) EPC. European Patent Application No. 06113481.3. Dated: Mar. 29, 2011.
Summons to Attend Oral Proceedings Pursuant to Rule 115(1) EPC. European Patent Application No. 06115690.7. Dated: Mar. 7, 2011.
Office Action. Canadian Patent Application No. 2,587,306. Dated: Apr. 7, 2011.
Provision of a copy of the minutes in accordance with Rule 124(4) EPC, for European Patent Application No. 06113481.3, dated Dec. 20, 2011.
Office Action for Canadian Patent Application No. 2,587,306, dated May 16, 2012.
Request for Continued Examination for U.S. Appl. No. 11/455,180, dated Jan. 9, 2012.
Notice of Allowance for U.S. Appl. No. 11/455,180, dated Jun. 21, 2012.
Chang, "Distributed Authentication of Program Integrity Verification in Wireless Sensor Networks", 2006, Securecomm and Workshops, pp. 1-10.
Notice of Allowance for Canadian Patent Application No. 2,587,232, dated Feb. 9, 2012.
Acknowledgement of withdrawal of European Patent Application No. 06115690.7, dated Jun. 10, 2011.
Wolfgang Rankl, "Smart Card Handbook", 2003, John Wiley & Sons, Ltd, 3rd edition.
Terminal Disclaimer and Interview Summary with Examiner. U.S. Appl. No. 11/455,180. Dated: Dec. 8, 2011.
Notice of Allowance. U.S. Appl. No. 11/455,180. Dated: Dec. 21, 2011.
Decision to Refuse a European Patent Application. European Patent Application No. 06113481.3. Dated: Dec. 20, 2011.
Tzone I. Wang et al., "A Two-layer Cryptographic Scheme for an e-Service Framework Based on Mobile Agents", 2004 IEEE International Conference on e-Technology, e-Commerce and e-Service. (Accompanied Notice of Allowance).

* cited by examiner

ABSTRACTBEGIN

SYSTEM AND METHOD FOR PROCESSING CERTIFICATES LOCATED IN A CERTIFICATE SEARCH

FIELD OF THE INVENTION

The invention relates generally to the processing of messages, such as e-mail messages, and more specifically to certificates used in the processing of encoded messages.

BACKGROUND

Electronic mail ("e-mail") messages may be encoded using one of a number of known protocols. Some of these protocols, such as Secure Multiple Internet Mail Extensions ("S/MIME") for example, rely on public and private encryption keys to provide confidentiality and integrity, and on a Public Key Infrastructure (PKI) to communicate information that provides authentication and authorization. Data encoded using a private key of a private key/public key pair can only be decoded using the corresponding public key of the pair. Similarly, data encoded using the public key of a private key/public key pair can only be decoded using the corresponding private key of the pair. The authenticity of public keys used in the encoding of messages may be validated using certificates. For example, if a user of a computing device (e.g. a mobile device) wishes to encrypt a message before the message is sent to a particular individual, the user will require a certificate for that individual. That certificate will typically comprise the public key of the individual, as well as other identification-related information. If the requisite certificate for the intended recipient is not already stored on the user's computing device, the certificate must first be retrieved. Searching for and retrieving a certificate for a specific recipient is a process that generally involves querying a certificate server, by having the user manually enter the name and/or e-mail address of the intended recipient in a search form displayed on the computing device, such as that provided in a certificate browser, for example.

In an example implementation of a first type, all of the certificates located in the search are then temporarily downloaded to the computing device for processing so that a list of the located certificates may be displayed to the user in the certificate browser. A user may select certificates identified in the list, and the selected certificates may be more permanently stored in a non-volatile store on the computing device for potential future use. In an example implementation of a second type, instead of temporarily downloading all of the certificates located in the search to the computing device in the first instance, only certain data needed to generate the list of certificates located in the search may be initially downloaded to the computing device. The list is displayed to a user, and typically identifies each located certificate using the common name and e-mail address of the individual to whom the respective certificate has been issued. Only after the user selects one or more specific certificates from the list are any certificates downloaded (i.e. the user-selected ones) to the computing device for storage. In particular, if the computing device is a mobile device, deferring the downloading of certificates to the mobile device and only downloading the user-selected certificates can significantly minimize waste of resources.

Unfortunately, in known systems, it is not generally possible to determine at the computing device the status of a certificate located in a search without first downloading the certificate to the computing device for processing, unless the certificate happens to be already stored on the computing device. Without first knowing the status of any given certificate identified in a list of search results, a user may unknowingly select a revoked or expired certificate from the list to be downloaded to the computing device. To prevent this occurrence, each certificate located in the search and not stored on the computing device might be, at least temporarily, downloaded to the computing device in its entirety. This would facilitate a determination of each certificate's status at the computing device so that the user can be informed prior to selecting certificates to be stored for future use. However, any benefits that would otherwise be attained by deferring the downloading of certificates (e.g. in implementations of the second type) would be lost. Moreover, downloading all of the certificates located in a search in order to determine their status in advance of user selection may be particularly wasteful (e.g. in terms of time and bandwidth) if some of the certificates have been needlessly downloaded to the computing device because they have been revoked or have expired.

BRIEF DESCRIPTION OF DRAWINGS

For a better understanding of embodiments of the systems and methods described herein, and to show more clearly how they may be carried into effect, reference will be made, by way of example, to the accompanying drawings in which.

DETAILED DESCRIPTION

Embodiments of the systems and methods described herein relate generally to the processing of certificates located in a certificate search, so as to facilitate an indication of the status of those certificates to a user of a computing device (e.g. a mobile device), without first having to download those certificates to the computing device in their entirety. This would, for instance, allow a user to quickly determine, prior to selecting certificates for storage on the computing device from a list of certificates located in the search, whether or not it would be desirable to download a specific certificate to the computing device based on the status for the specific certificate as indicated to the user.

In one broad aspect, there is provided a method of processing certificates located in a certificate search, wherein the steps of the method are performed at a data server coupled to a computing device, the method comprising the steps of: receiving a certificate search request from the computing device; initiating a certificate search on one or more certificate servers, wherein at least one query is submitted to the one or more certificate servers to request retrieval of certificates satisfying the certificate search request; retrieving one or more certificates from the one or more certificate servers; processing each of the one or more certificates retrieved at the retrieving step to determine certificate data identifying the respective certificate and status data by verifying at least one status property of the respective certificate at the data server; and transmitting data determined at the processing step for at least one of the one or more certificates retrieved at the retrieving step to the computing device; wherein the transmitted data is usable by the computing device to identify each of the at least one certificate to a user and to generate at least one status indicator for each of the at least one certificate for display to the user.

Features of these and other aspects, and of a number of embodiments of systems and methods are described below.

The description of some embodiments of the systems and methods described herein make reference to a mobile device, also known in the art as a mobile station. A mobile device is a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 1:
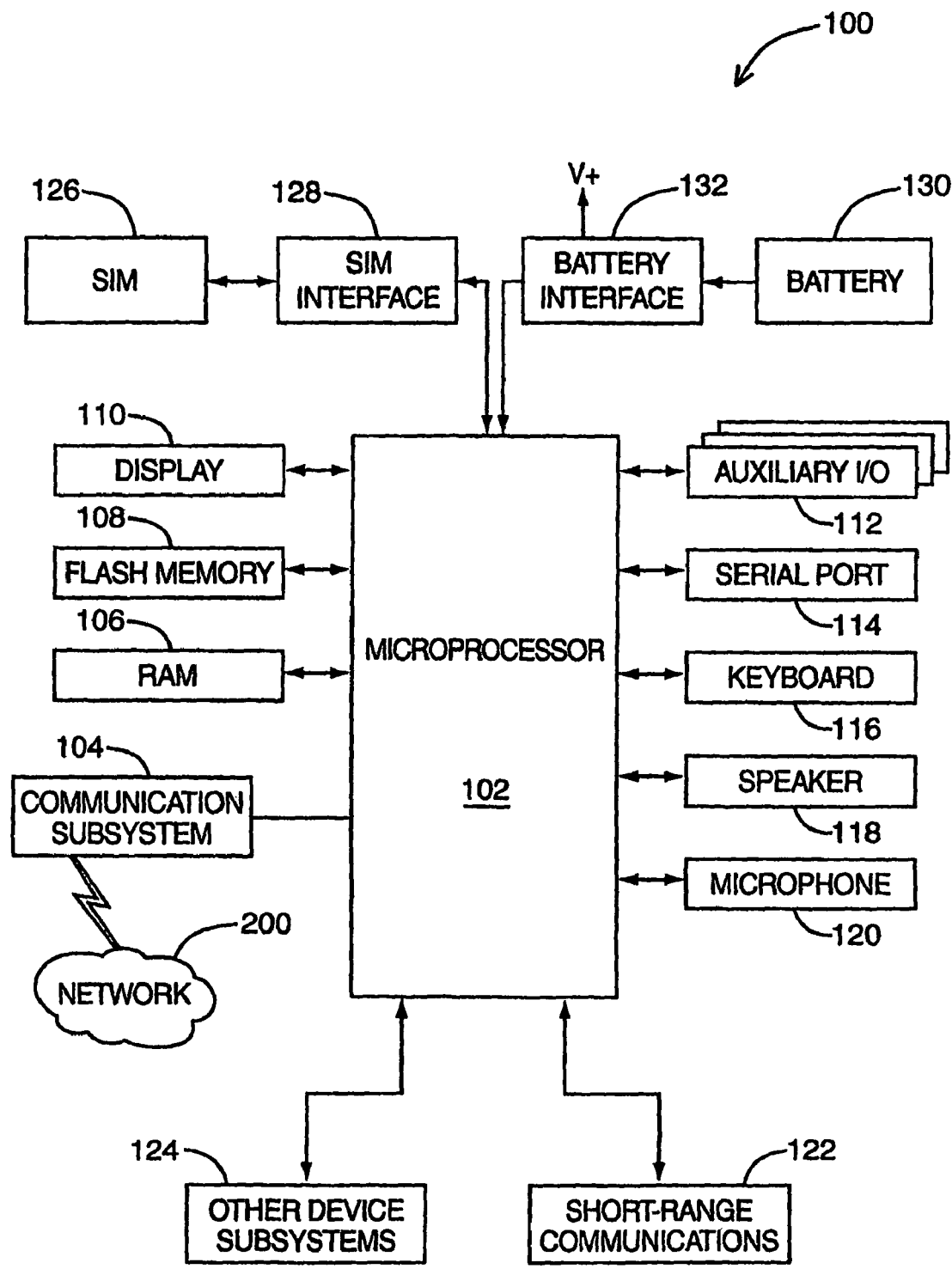
FIG. 1 is a block diagram of a mobile device in one example implementation.
Figure 2:
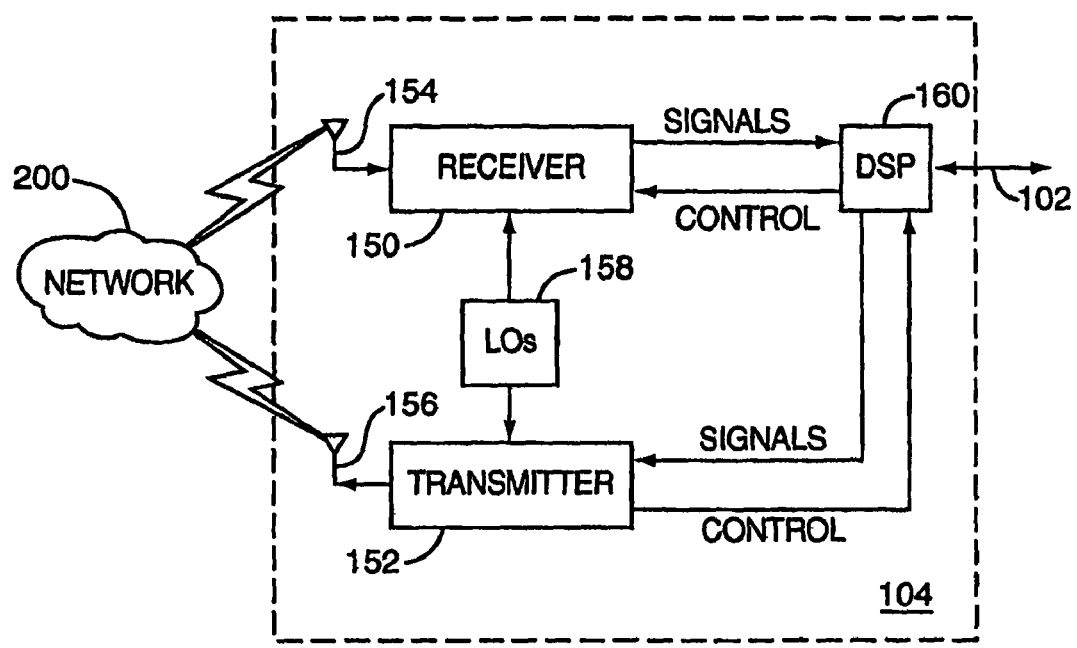
FIG. 2 is a block diagram of a communication subsystem component of the mobile device of FIG. 1.
Figure 3:
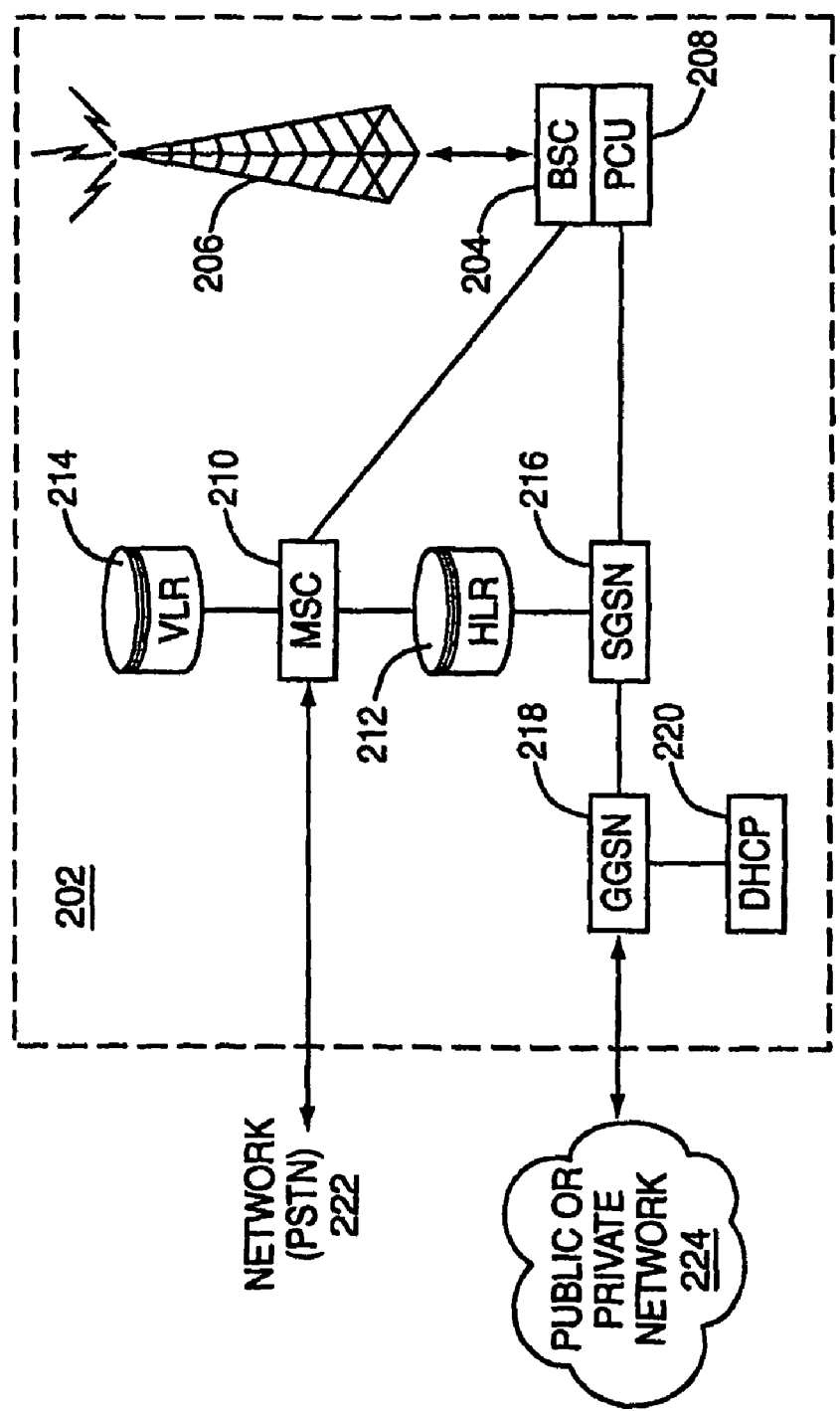
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Other network communication technologies that may be employed include, for example, Integrated Digital Enhanced Network (iDEN™), Evolution-Data Optimized (EV-DO), and High Speed Downlink Packet Access (HSDPA).

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary I/O subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (Ipsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
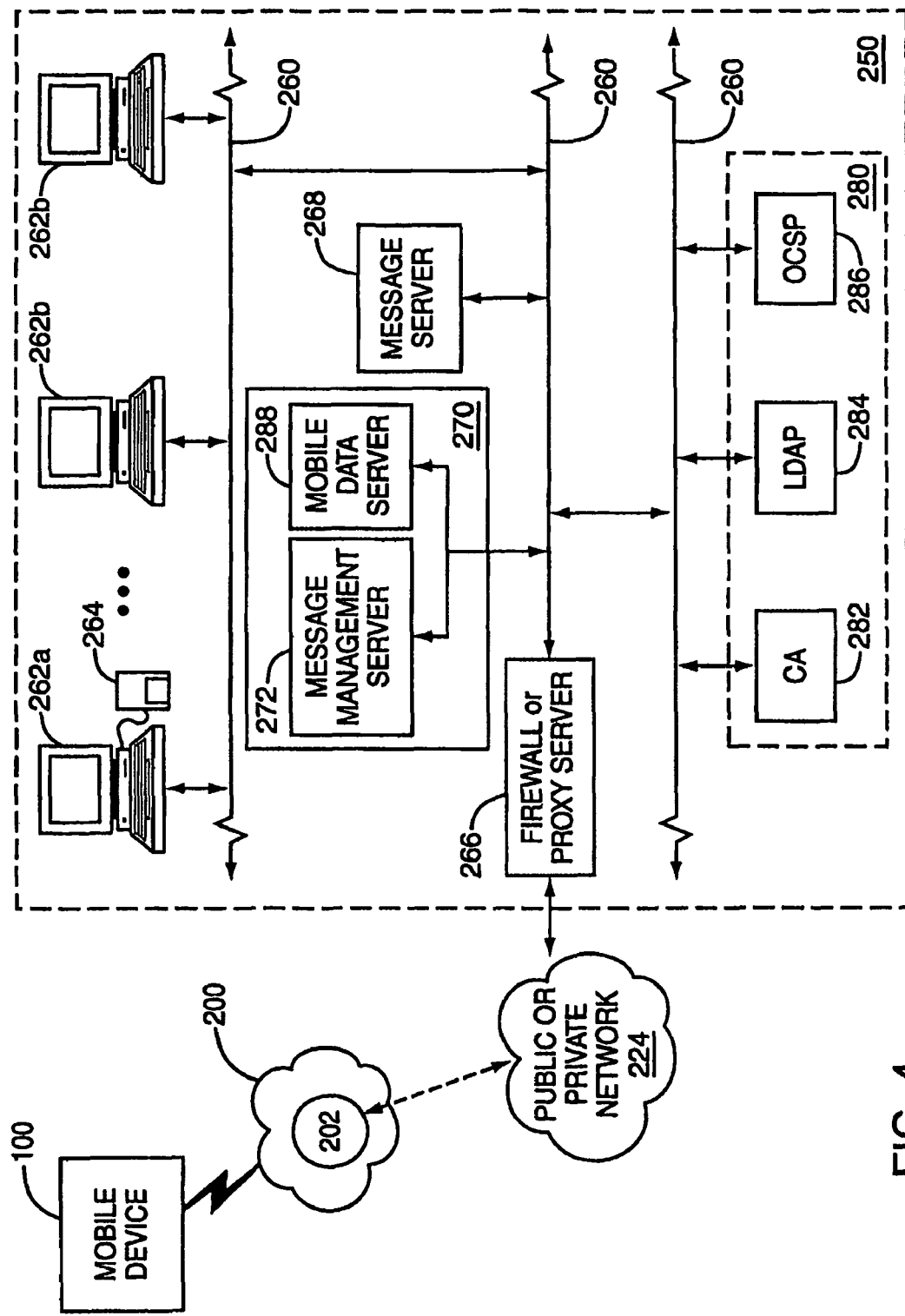
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computing device ("desktop computer") 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. The process of downloading information from a user's desktop computer 262a to the user's mobile device 100 may also be referred to as synchronization.

It will be understood by persons skilled in the art that user computers 262a, 262b will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in the example configuration of FIG. 4. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the mobile device 100 itself. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and reroute the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the first part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices need to be supported.

Certificates may be used in the processing of encoded messages, such as e-mail messages. An encoded message may be encrypted and/or digitally signed, for example. While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and provides data integrity and privacy from the time an originator of a message sends a message until it is decoded and read by the message recipient.

Secure messaging protocols such as S/MIME rely on public and private encryption keys to provide confidentiality and integrity, and on a Public Key Infrastructure (PKI) to communicate information that provides authentication and authorization. Data encoded using a private key of a private key/public key pair can only be decrypted using the corresponding public key of the pair, and data encoded using a public key of a private key/public key pair can only be decoded using the corresponding private key of the pair. It is assumed that private key information is never made public, whereas public key information is shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate decryption of the message, and in this way, the confidentiality of messages can be maintained.

As a further example, a sender may sign a message using a digital signature. A digital signature is a digest of the message (e.g. a hash of the message) encoded using the sender's private key, which can then be appended to the outgoing message. To verify the signature of the message when received, the recipient uses the same technique as the sender (e.g. using the same standard hash algorithm) to obtain a digest of the received message. The recipient also uses the sender's public key to decode the digital signature, in order to obtain what should be a matching digest for the received message. If the digests of the received message do not match, this suggests that either the message content was changed during transport and/or the message did not originate from the sender whose public key was used for verification. Digital signature algorithms are designed in such a way that only someone with knowledge of the sender's private key should be able to encode a signature that the recipient will decode correctly using the sender's public key. Therefore, by verifying a digital signature in this way, authentication of the sender and message integrity can be maintained.

An encoded message may be encrypted, signed, or both encrypted and signed. The authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509).

It will be understood by persons skilled in the art that other known standards and protocols may be employed to facilitate secure message communication, such as Pretty Good Privacy™ (PGP), variants of PGP such as OpenPGP, and others known in the art. In some of these other standards and protocols, constructs may be employed that are not commonly identified as "certificates" per se, but are used to perform a similar function or have similar features. For example, a construct may provide a public key, certain information about the key holder, and/or information necessary to verify the authenticity of the public key. One example of such a construct is a "PGP key", employed in PGP-based protocols. Such constructs may be deemed to be "certificates", as referred to in the specification and in the claims.

Figure 5:
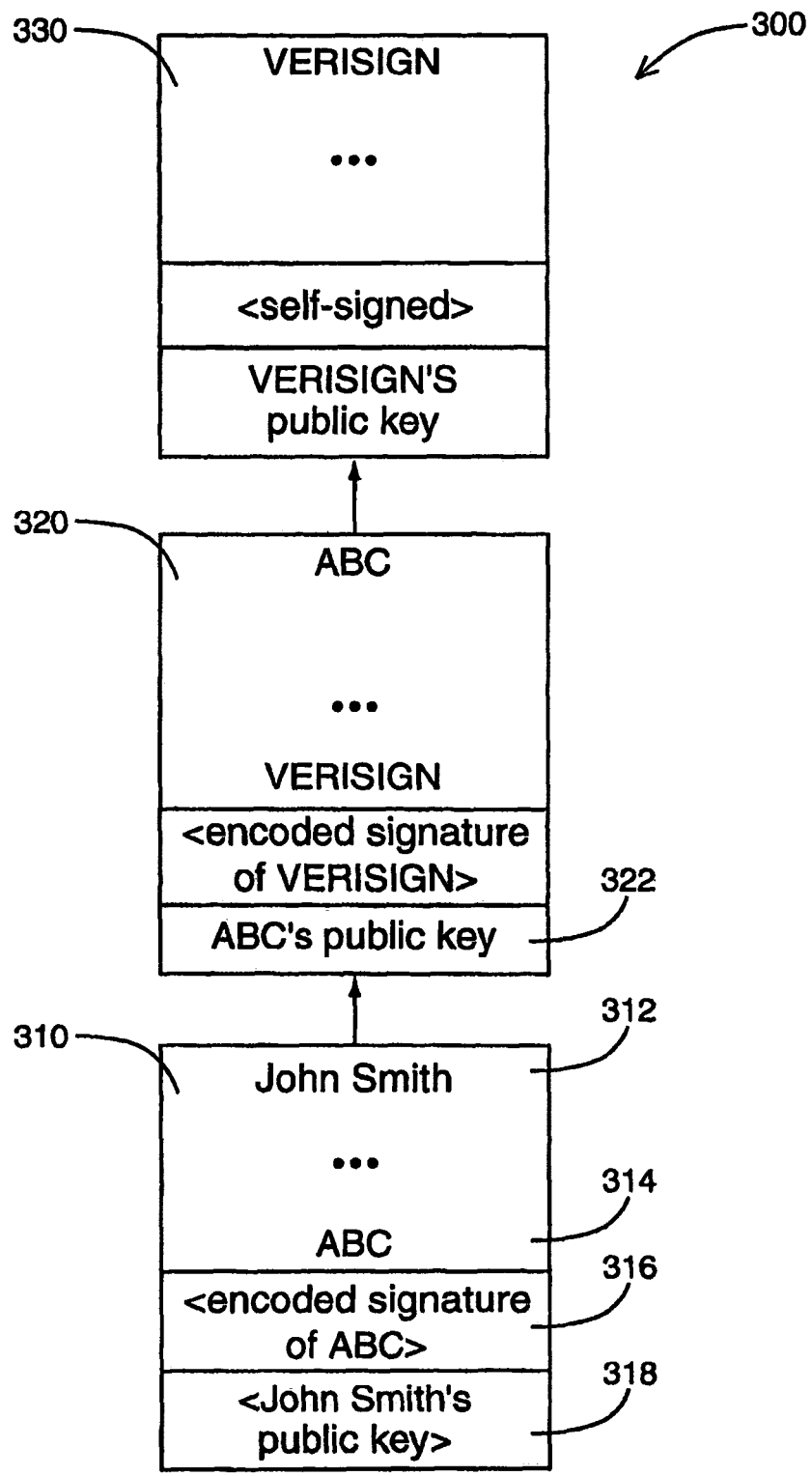
FIG. 5 is a block diagram showing an example of a certificate chain.

Referring now to FIG. 5, an example certificate chain 300 is shown. Certificate 310 issued to "John Smith" is an example of a certificate issued to an individual, which may be referred to as an end entity certificate. End entity certificate 310 typically identifies the certificate holder 312 (i.e. John Smith in this example) and the issuer of the certificate 314, and includes a digital signature of the issuer 316 and the certificate holder's public key 318. Certificate 310 will also typically include other information and attributes that identify the certificate holder (e.g. e-mail address, organization name, organizational unit name, location, etc.). When the individual composes a message to be sent to a recipient, it is customary to include that individual's certificate 310 with the message.

For a public key to be trusted, its issuing organization must be trusted. The relationship between a trusted CA and a user's public key can be represented by a series of related certificates, also referred to as a certificate chain. The certificate chain can be followed to determine the validity, or more particularly, the trust status of a certificate.

For instance, in the example certificate chain 300 shown in FIG. 5, the recipient of a message purported to be sent by John Smith may wish to verify the trust status of certificate 310 attached to the received message. To verify the trust status of certificate 310 on a recipient's computing device (e.g. computer 262a of FIG. 4) for example, the certificate 320 of issuer ABC is obtained, and used to verify that certificate 310 was indeed signed by issuer ABC. Certificate 320 may already be stored in a certificate store on the computing device, or it may need to be retrieved from a certificate source (e.g. LDAP server 284 of FIG. 4 or some other public or private LDAP server). If certificate 320 is already stored in the recipient's computing device and the certificate has been designated as trusted by the recipient, then certificate 310 is considered to be trusted since it chains to a stored, trusted certificate.

However, in the example shown in FIG. 5, certificate 330 is also required to verify the trust of certificate 310. Certificate 330 is self-signed, and is referred to as a "root certificate". Accordingly, certificate 320 may be referred to as an "intermediate certificate" in certificate chain 300; any given certificate chain to a root certificate, assuming a chain to the root certificate can be determined for a particular end entity certificate, may contain zero, one, or multiple intermediate certificates. If certificate 330 is a root certificate issued by a trusted source (from a large certificate authority such as Verisign or Entrust, for example), then certificate 310 may be considered to be trusted since it chains to a trusted certificate. The implication is that both the sender and the recipient of the message trust the source of the root certificate 330. If a certificate cannot be chained to a trusted certificate, the certificate may be considered to be "not trusted".

Certificate servers store information about certificates and lists identifying certificates that have been revoked. These certificate servers can be accessed to obtain certificates and to verify certificate authenticity and revocation status. For example, a Lightweight Directory Access Protocol (LDAP) server may be used to obtain certificates, and an Online Certificate Status Protocol (OCSP) server may be used to verify certificate revocation status.

Standard e-mail security protocols typically facilitate secure message transmission between non-mobile computing devices (e.g. computers 262a, 262b of FIG. 4; remote desktop devices). Referring again to FIG. 4, in order that signed messages received from senders may be read from mobile device 100 and encrypted messages be sent to those senders, mobile device 100 is adapted to store certificates and associated public keys of other individuals. Certificates stored on a user's computer 262a will typically be downloaded from computer 262a to mobile device 100 through cradle 264, for example.

Certificates stored on computer 262a and downloaded to mobile device 100 for storage thereon are not limited to certificates associated with individuals but may also include certificates issued to CAs, for example. Certain certificates stored in computer 262a and/or mobile device 100 can also be explicitly designated as "trusted" by the user. Accordingly, when a certificate is received by a user on mobile device 100, it can be verified on mobile device 100 by matching the certificate with one stored on mobile device 100 and designated as trusted, or otherwise determined to be chained to a trusted certificate.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key is preferably exchanged between the computer 262a and mobile device 100 so that the user may share one identity and one method for accessing messages.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server 288. Similarly, mobile data server 288 may be adapted to allow mobile device 100 to directly query OCSP server 286 to verify the revocation status of certificates.

It will be understood by persons skilled in the art that mobile data server 288 need not physically reside on a separate computing device from the other components of LAN 250, and that mobile data server 288 may be provided on the same computing device as another component of LAN 250 in variant implementations. Furthermore, the functions of mobile data server 288 may be integrated with the functions of another component in LAN 250 (e.g. message management server 272) in variant implementations.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates [not shown] may include a Windows certificate store, another secure certificate store on or outside LAN 250, and smart cards, for example.

Figure 6:
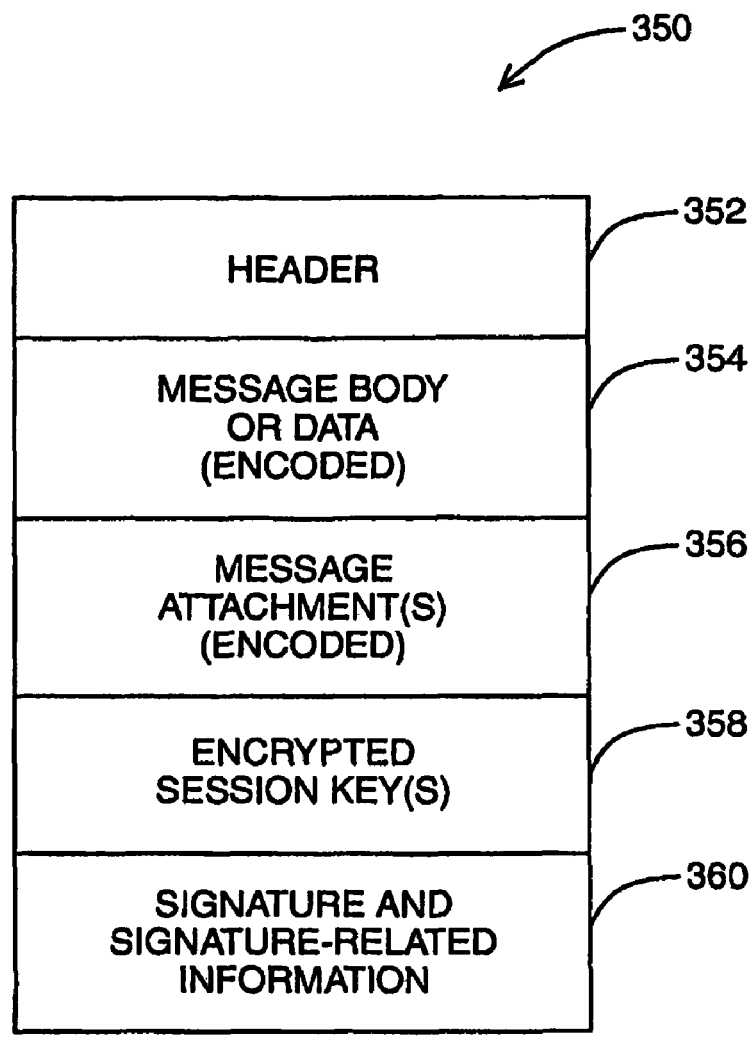
FIG. 6 is a block diagram illustrating components of an example of an encoded message.

Referring now to FIG. 6, a block diagram illustrating components of an example of an encoded message, as may be received by a message server (e.g. message server 268 of FIG. 4), is shown generally as 350. Encoded message 350 typically includes one or more of the following: a header portion 352, an encoded body portion 354, optionally one or more encoded attachments 356, one or more encrypted session keys 358, and signature and signature-related information 360. For example, header portion 352 typically includes addressing information such as "To", "From", and "CC" addresses, and may also include message length indicators, and sender encryption and signature scheme identifiers, for example. Actual message content normally includes a message body or data portion 354 and possibly one or more attachments 356, which may be encrypted by the sender using a session key. If a session key was used, it is typically encrypted for each intended recipient using the respective public key for each recipient, and included in the message at 358. If the message was signed, a signature and signature-related information 360 are also included. This may include the sender's certificate, for example.

The format for an encoded message as shown in FIG. 6 is provided by way of example only, and persons skilled in the art will understand that encoded messages may exist in other formats. For example, depending on the specific messaging scheme used, components of an encoded message may appear in a different order than shown in FIG. 6, and an encoded message may include fewer, additional, or different components, which may depend on whether the encoded message is encrypted, signed or both.

As noted earlier, embodiments of the systems and methods described herein relate generally to the processing of certificates located in a certificate search, so as to facilitate an indication of the status of those certificates to a user of a computing device (e.g. a mobile device), without first having to download those certificates to the computing device in their entirety. This would, for instance, allow a user to quickly determine, prior to selecting certificates for storage on the computing device from of a list of certificates located in the search, whether or not it would be desirable to download a specific certificate to the computing device based on the status for the specific certificate as indicated to the user. For example, the user can be notified, in advance, of which certificates located in the search have been revoked or have expired.

Embodiments of the systems and methods described herein may be particularly applicable to systems which use a two-phase certificate retrieval technique, as previously described with respect to implementations of a second type in which the downloading of certificates to a computing device is deferred.

This two-phase certificate retrieval technique is described generally in greater detail below, by way of illustration, with reference to a system where the computing device is a mobile device, and where an intermediate computing device or data server (e.g. mobile data server 288 of FIG. 4) is coupled to the mobile device through which the mobile device can make certificate search requests of a certificate server (e.g. LDAP server 284 of FIG. 4).

With reference to FIG. 4, consider an example implementation where a certificate search application on mobile device 100 is adapted to search for and retrieve individual certificates from LDAP server 284 through mobile data server 288. The certificate search application will typically provide a user interface that may be referred to as a certificate browser. A search request is received by the certificate search application, typically from a user who provides a first name, last name, and e-mail address of an individual for whom the user wishes to locate a certificate. Certain search requests may also be made broader, by constructing search queries where inputting only a few letters of a name will return all certificates issued with a name containing those letters as a prefix, or by otherwise using wild cards or blank entries in input fields to expand a search, for example. The search request is then communicated from mobile device 100 to mobile data server 288, which then queries LDAP server 284 for the requested certificate(s).

In this example implementation, located certificates are retrieved by the mobile data server 288, and specific certificate data relating to each retrieved certificate, such as the common name and e-mail address of the individual (or entity) to which the respective certificate is issued, is transmitted to mobile device 100, so that a list can be generated for display to the user of mobile device 100 in the certificate browser. The user can then select specific certificates from the list for downloading to and storage on mobile device 100. The selections are then communicated back to mobile data server 288, from which the selected certificates are downloaded to mobile device 100 for storage in a certificate store on the mobile device (e.g. within flash memory 108 of FIG. 1 for example).

By communicating only specific certificate data needed to generate a list of located certificates instead of entire certificates to mobile device 100 in the first instance, and by only downloading specific certificates as selected by the user, the search and retrieval of certificates can be performed more efficiently (e.g. in terms of time and bandwidth).

It may also be important for the user to know the status of each certificate identified in the list displayed to the user of mobile device 100 in the certificate browser. The "status" of a certificate may be defined differently in variant implementations. By way of example, the status of a certificate may be defined as a state that is dependent on a combination of status properties of the certificate including certificate validity (i.e. certificate expiry), revocation status, encryption key strength, and trust status.

Applications executing on mobile device 100 that process certificates that are stored on mobile device 100, after having determined their status, may provide a status indicator to the user. For example, the status indicator may be an icon that is displayed in a visual state identifying the status for a given certificate (e.g. a check mark if the status of a certificate is "good", an "X" if the status of a certificate is "bad", or a question mark if the status of the certificate was not determinable or is otherwise "unknown").

Unfortunately, the certificate search application in the two-stage example implementation described above may not be adapted to provide such a status indicator for each certificate identified in a list of search results. It is not generally possible to determine the status of a certificate located in a search without first downloading the certificate to the computing device for processing, unless the certificate happens to be already stored on the mobile device. In this example implementation, certificates located in the search would only be downloaded to the mobile device after the user has selected specific certificates from the list of search results, in order to conserve bandwidth. Accordingly, a status indicator for any certificate not already stored on the mobile device may not be provided.

However, without first knowing the status of any given certificate identified in a list of search results, a user may unknowingly select a revoked or expired certificate from the list to be downloaded to the computing device. If the user were to use such a certificate, there would be a risk of a security breach. Even if the selected certificate were to be downloaded without the user knowing the status of the certificate in advance, but the user is subsequently warned that the certificate has been revoked or has expired and prevented from using the certificate, time and bandwidth associated with the unnecessary downloading of the certificate to the mobile device would nonetheless be wasted.

In a broad aspect, a technique is generally described herein that would facilitate the providing of a status indicator in the certificate browser of a computing device such as mobile device 100 for each certificate located in a certificate search, without the overhead of downloading each of the located certificates in its entirety to the computing device prior to user selection.

Figure 7:
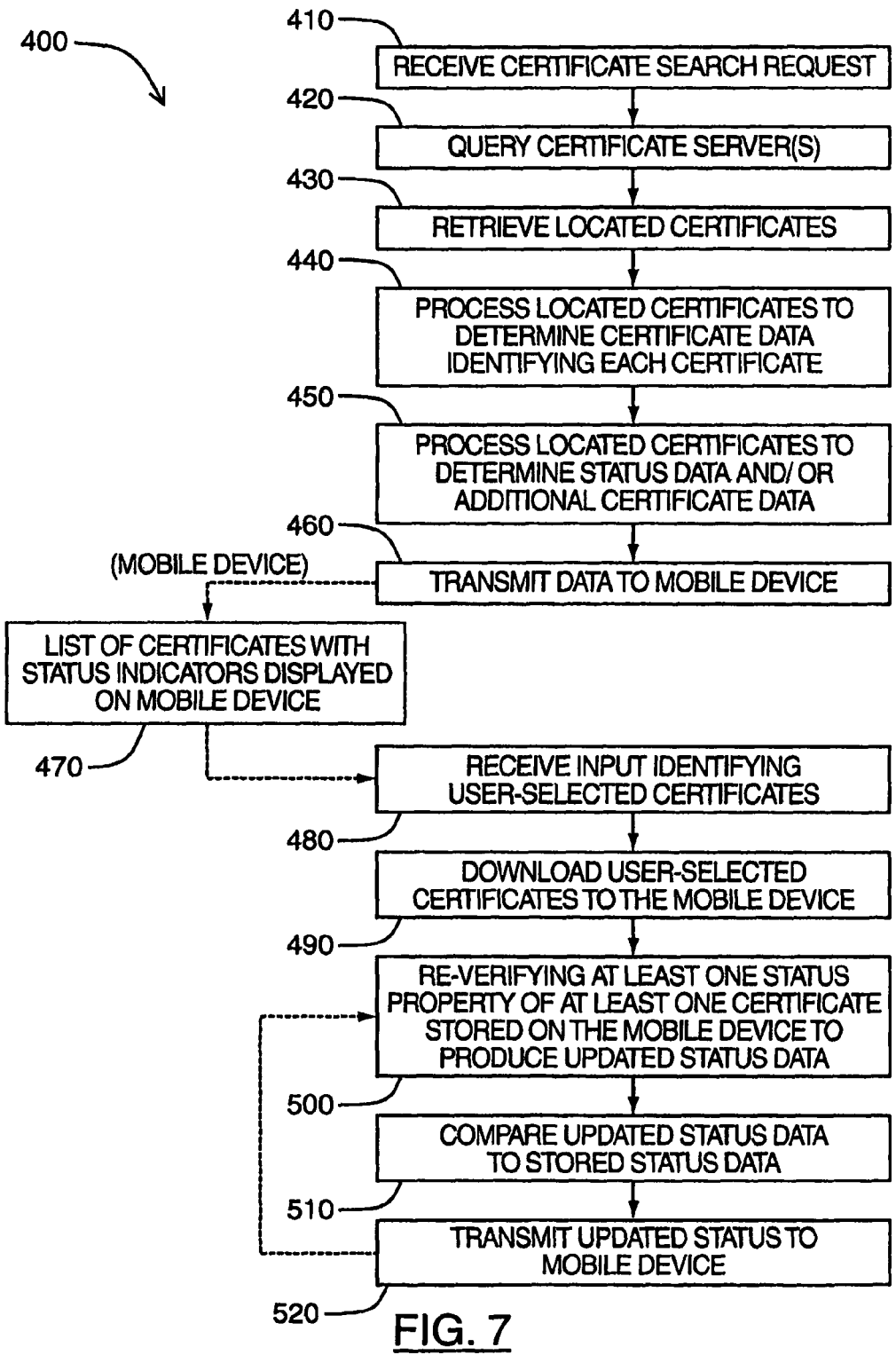
FIG. 7 is a flowchart illustrating steps in a method of processing certificates located in a certificate search in a number of example embodiments.

Referring to FIG. 7, a flowchart illustrating steps in a method of processing certificates located in a certificate search in a number of example embodiments is shown generally as 400.

In method 400, a data server (e.g. mobile data server 288 of FIG. 4), through which a computing device (e.g. mobile device 100 of FIG. 4) requests the performance of a certificate search, computes status data that can be used to indicate the status of each certificate located in the certificate search at the computing device (e.g. in a certificate browser) by verifying one or more status properties of the certificates. The status data may comprise individual verification results associated with the verified status properties, or it may comprise one or more identifiers or attributes derived from a combination of the individual verification results. The data server can then forward the status data computed thereon to the computing device, along with the certificate data used to generate a list of search results on the computing device.

Further, if a particular status property of a certificate cannot be verified at the data server and can only be determined with information available on the computing device (e.g. with access to stored certificates on the computing device), then the data server can forward to the computing device additional certificate data that is required by the computing device to verify the particular status property at the computing device.

The verification results associated with the various status properties of each certificate can then be used to generate one or more status indicators for each of the certificates in the list of search results at the computing device, for display to the user of the computing device.

For ease of exposition, steps of method 400 will now be described with reference to an example system where the data server is a mobile data server, and the computing device coupled to the data server is a mobile device. However, method 400 may be applied to other embodiments and system configurations, where the data server is not a mobile data server but is some other computing device adapted to query one or more certificate servers and/or where the computing device coupled to the data server is not a mobile device but is some other computing device.

At step 410, the mobile data server receives a request from the mobile device to search at least one certificate server for certificates. In this example system, the mobile data server acts as an intermediary between the mobile device and the at least one certificate server. In one example implementation, a certificate server to be searched may be an LDAP server (e.g. LDAP server 284 of FIG. 4).

Typically, the certificate server will be provided by a different server remote from the mobile data server. However, in variant embodiments, the mobile data server may maintain its own local cache of certificates, which can be searched and from which certificates may be retrieved.

The request may comprise input data provided by a certificate search application executing and residing on the mobile device. The data may originate from user input to the certificate search application (e.g. when the search is initiated by a user through a certificate browser), or from data generated by an application that initiates the search in variant implementations. The data will typically include at least one name and/or an e-mail address, although it will be understood by persons skilled in the art that a variety of search queries may be constructed in variant embodiments.

At step 420, the mobile data server queries the at least one certificate server for certificates based on the certificate search request received at step 410 from the certificate search application of the mobile device.

At step 430, certificates located in the search initiated by querying the at least one certificate server at step 420 are retrieved from the at least one certificate server by the mobile data server.

At step 440, the mobile data server processes each located certificate retrieved at step 430 to determine certificate data identifying each certificate. This certificate data, when transmitted to the mobile device (at step 460), can be used by the mobile device to identify the certificates located in the search in a list format, for example. Accordingly, the user may be apprised of the certificates located in the search without the need for the actual certificates to be downloaded to the mobile device until after the user selects desired certificates from the list.

The certificate data may comprise certain attributes of the respective certificates such as the label or common name on the certificate, as well as the e-mail address provided on the certificate, for example. The certificate data may also comprise a hash of the certificate, for example, which may be used by the mobile device to determine whether the certificate already exists in storage on the mobile device. Additional and/or alternative certificate data may be determined at this step for subsequent transmission to the mobile device in variant embodiments.

At step 450, the mobile data server further processes each located certificate retrieved at step 430 to determine status data for each certificate. The status data for a given certificate will typically be derived from the results of verifications of one or more status properties of the certificate performed at the mobile data server.

However, under some circumstances, it may not be possible to verify a particular status property of a given certificate at the mobile data server because all of the information needed to verify the status property is not stored on the mobile data server. In those cases, for those particular status properties not verifiable at the mobile data server, the status data determined at step 450 may comprise additional certificate data that can be used by the mobile device to verify those status properties at the mobile device.

For example, in one embodiment, the status of a certificate is defined as a state that is dependent on a combination of status properties of the certificate including: (1) certificate validity (i.e. certificate expiry), (2) revocation status, (3) encryption key strength, and (4) trust status.

(1) Certificate Validity/Expiry: This status property may be verified for a certificate at the mobile data server by parsing the certificate and comparing the expiry date with the system time on the mobile data server. The result of the verification may be a Boolean value, for example, indicating whether the certificate is valid (i.e. the certificate has not expired) or not.

(2) Revocation Status: This status property may be verified for a certificate at the mobile data server by querying an OCSP server (e.g. OCSP server 286) and/or a certificate revocation list(s) ("CRL") server to determine if the certificate has been revoked or not. The result of the verification may be an integer value, for example, indicating if the revocation status of the certificate is "good", "revoked", or "unknown".

(3) Encryption Key Strength: This status property may be verified for a certificate at the mobile data server by parsing the certificate to identify the applicable encryption algorithm and key length, and then comparing these characteristics with, for example, requirements defined by an IT Policy, to determine if the key is "strong". The IT Policy may reflect how an organization's administrator has defined what public key length is considered to be "strong", for example. The result of the verification may be a Boolean value, for example, indicating if the key associated with the certificate is strong or not.

(4) Trust Status: It may be possible to verify this status property for a certificate at the mobile data server if there is stored and maintained [steps not shown] on the mobile data server, or on some other computing device coupled to the mobile data server (e.g. message management server 272 of FIG. 4), a record or copy of the certificates stored on the mobile device, and if it is possible to determine which of these certificates have been identified as "trusted" by a user. In that case, the mobile data server can attempt to build the requisite certificate chain (e.g. as discussed with reference to the example of FIG. 5) to determine certificate chain-based properties such as trust status. The result of the verification may be a Boolean value, for example, indicating if the certificate is trusted or not.

However, if the mobile data server does not know which certificates are identified as trusted on the mobile device, it will not typically be possible to verify the trust status for a certificate at the mobile data server. In that case, the mobile data server may instead generate additional certificate data that can be used by the mobile device to verify the trust status of the certificate at the mobile device. For example, the mobile data server may parse the certificate to identify the name of the issuer of the certificate and the serial number of the certificate. This additional certificate data can be subsequently transmitted to the mobile device, and the mobile device can use this information to build the requisite certificate chain in order to determine if the certificate is trusted or not.

As noted earlier, the status data determined at step 450 may comprise individual verification results associated with the verified status properties, or it may comprise one or more identifiers derived from a combination of the individual verification results.

For example, in one embodiment, the status data comprises a single verification result derived from the verification results of all of the above-mentioned status properties. More specifically, if it is determined that a particular certificate has not expired, has not been revoked, comprises a key that is considered strong, and is trusted (as determined at the mobile data server), then a first value indicating a "good" status may be assigned to the single verification result associated with that certificate. On the other hand, a second value indicating a "bad" status may be assigned if the verification of any of the status properties produced a negative result. A third value indicating an "unknown" status may also be assigned if none of the status properties, when verified, produced a negative result, but at least one of the status properties could not be otherwise verified as being "good", for example.

In another embodiment, the status data comprises individual verification results, one for each of the above-mentioned status properties. These individual verification results may be transmitted as status data to the mobile device for further processing, thereby informing the mobile device of which specific status properties were successfully verified and which were not. This may be helpful where more than one status indicator is to be displayed to the user for each certificate in a list of search results, for example.

In another embodiment, the status data may comprise a combination of (i) individual verification results or a single verification result associated with a subset of the above-mentioned status properties that are verifiable at the data server and/or (ii) additional certificate data to verify the status properties at the mobile device which could not be verified at the data, server.

In variant embodiments, other status properties may be verified at the mobile data server and/or the mobile device, and the status data may comprise additional and/or alternative data.

At step 460, the data determined at steps 440 and 450, for at least one of the certificates located in the search and retrieved by the mobile data server at step 430, is transmitted to the mobile device. The transmitted data for a given certificate typically includes certificate data, and status data and/or possibly additional certificate data depending on the embodiment.

In one embodiment, data for all of the certificates located in the search are transmitted to the mobile device at step 460, so that a list of all located certificates (or other means for identifying the located certificates) and at least one status indicator displayable to the user for each of those certificates can be generated at the mobile device.

In another embodiment, only data for a subset of the certificates located in the search is transmitted by the mobile data server to the mobile device. For example, certificates that have been determined to have a "bad" status may be automatically filtered, and the associated data for these certificates at step 440 and 450 may be withheld by the mobile data server and not transmitted to the mobile device. Other filtering criteria may be applied in variant embodiments.

Consequently, at the mobile device (shown at 470), a list of located certificates is generated and displayed to a user of the mobile device, based on the data transmitted by the mobile data server to the mobile device at step 460. For instance, the list may identify each located certificate by the common name and/or e-mail address of the individual (or entity) to which the certificate is issued. At least one status indicator is also generated and displayed to the user, accompanying the respective entry on the list for each located certificate. In one embodiment, a single status indicator in the form of a single icon that is displayed in a visual state identifying the status for a given certificate (e.g. a check mark if the status of a certificate is "good", an "X" if the status of a certificate is "bad", or a question mark if the status of the certificate was not determinable or is otherwise "unknown") is provided.

A status indicator indicating whether the particular certificate is already stored on the mobile device may also be provided. This may prevent users from downloading duplicate certificates to the mobile device.

In a variant embodiment, multiple icons may be displayed depicting the verification results of specific status properties associated with each certificate.

It will be understood that additional processing [steps not shown] may need to be performed at the mobile device before the status indicator(s) for a certificate can be generated and displayed. For example, additional certificate data may be employed in verifying one or more status properties at the mobile device before a status indicator is generated. As a further example, a check may be made to determine if a certificate identified in the list is already stored on the mobile device. As a further example, verification results as determined at the data server and/or at the mobile device will be processed to determine the appropriate state of the single status indicator to be displayed to the user.

By providing a status indicator for each certificate identified in a list of search results, a user can determine quickly whether or not a particular certificate should be selected for download.

Certificates may then be selected for download [step not shown] by the user of the mobile device, and subsequently, at step 480, input data identifying the user-selected certificates is received by the mobile data server from the mobile device. The user-selected certificates may then be returned (i.e. downloaded) to the mobile device at step 490, typically for storage on the mobile device. It may be necessary for the mobile data server to query a certificate server again for a selected certificate [step not shown] before the certificate is returned to the mobile device, in the event that the mobile data server did not retain the certificate when the certificate was initially retrieved at step 430.

Where a record or copy of certificates being stored on the mobile device is being maintained at the mobile data server (or other computing device coupled to the mobile data server), a record or copy of the certificate(s) downloaded to the mobile device at step 490 may be used by the mobile data server to update the maintained data.

It will be understood by persons skilled in the art that the status associated with a certificate can change over time. For example, a certificate that at one time was determined to be "good" may subsequently be revoked. The status of a certificate is therefore a dynamic attribute.

Certificates that are downloaded to the mobile device from the data server at step 490 may originally have been selected by the user at a time when the status of the certificate was "good", as indicated by an appropriate status indicator in the list of search results displayed at the mobile device (step 470). Some time after the certificate has been stored on the mobile device, the status for a certificate stored on the mobile device may be changed (e.g. the certificate may have been revoked), unknown to the user. Therefore, it may be generally desirable to update the status of certificates stored on the mobile device from time-to-time. In a typical known system, updating the certificate status is a process that is initiated at the mobile device, typically by the user, possibly through the certificate search application or through a different application executing on the mobile device. The process usually involves querying an OCSP server or CRL server for the revocation status of a particular certificate and processing the response, and can be time-consuming and bandwidth intensive.

Accordingly, in one broad aspect, the status of a certificate can be updated automatically at the mobile data server and pushed to the mobile device. This can be applied to embodiments described herein where a record or copy of certificates being stored on the mobile device is being maintained at the mobile data server (or other computing device coupled to the mobile data server). This will typically require the mobile data server to track those certificates downloaded to the mobile device at step 490. The mobile data server may also track the status data for the certificates transmitted to the mobile device at step 460 by maintaining a copy of the transmitted status data at the mobile device, which can be used to facilitate status updates.

At step 500, the mobile data server re-verifies at least one status property of at least one certificate stored on the mobile device (according to the data tracked by the mobile data server), to determine updated status data. For example, the expiry date of certificates can be re-checked. OCSP and/or CRL servers can be re-queried to determine if the revocation status of certificates has changed. Other dynamic status properties can also be re-checked at this step. The re-verification can be performed periodically (e.g. the OCSP and/or CRL servers may be polled), to ensure that the status of certificates is kept up-to-date, and the period may be defined by an IT Policy.

Where a record or copy of status data transmitted to the mobile device at step 460 has been tracked by the mobile data server and thus maintained at the mobile data server (or other computing device coupled thereto), then at step 510, the updated status data determined at step 500 is compared to the copy of the status data maintained by the mobile data server (e.g. stored on the mobile data server or other computing device). If the status data has changed (e.g. if the updated status data differs from the stored status data), then the updated status data can be transmitted without requiring user intervention (i.e. "pushed") to the mobile device, as shown at step 520. The stored status data is modified to reflect the updated status data pushed to the mobile device [step not shown].

At the mobile device, upon receiving the status update, the user can be alerted to this information. Alternatively, the mobile device can silently accept the updated status information, and modify the status associated with the stored certificate. In any event, the status of certificates stored on the mobile device can be automatically kept up-to-date, potentially eliminating the need to perform status updates initiated at the mobile device, upon the sending or receiving of encoded message or when performing other certificate processing tasks, for example. The concept of a "stale status" of a certificate on the mobile device would no longer be applicable.

In the above example, the updated status data is transmitted to the mobile device at step 520 only if the status has changed from a previous status, as determined by the comparison made at step 510. In a variant embodiment, a copy of the status data is not maintained by the mobile data server, and any updated status data that is determined at step 500 may be transmitted to the mobile device at step 520 upon each update.

In that case, the mobile device itself would be adapted to compare the updated status data for a certificate that has been pushed to it (e.g. periodically) from the mobile data server, to determine if the status for the certificate has changed. However, this may be a more bandwidth intensive solution.

The steps of a method of processing certificates located in a certificate search in embodiments described herein may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A method of processing certificates located in a certificate search, wherein the method is performed at a data server coupled to a wireless communication device, the method comprising:
   receiving a certificate search request from the wireless communication device;
   initiating a certificate search on one or more certificate servers, wherein at least one query is submitted to the one or more certificate servers to request retrieval of certificates satisfying the certificate search request;
   retrieving one or more certificates from the one or more certificate servers;
   for each of the one or more certificates retrieved at the retrieving,
      processing the certificate prior to transferring the certificate to the wireless communication device to determine data comprising
      certificate data identifying the certificate, and
      status data by determining at the data server at least one status property of the certificate;
   for at least one of the one or more certificates retrieved at the retrieving,
      transmitting data determined at the processing to the wireless communication device prior to transferring the certificate to the wireless communication device;
   wherein the certificate data is usable by the wireless communication device to identify each of the at least one certificate in a user interface of the wireless communication device;
   wherein the status data determined at the processing is usable by the wireless communication device to generate at least one status indicator that indicates a result of determining at least one status property at the processing, for each of the at least one certificate located by the data server in response to a certificate search initiated by the wireless communication device, for display in the user interface of the wireless communication device prior to user selection of one or more of the at least one certificate for transfer from the data server to the wireless communication device; and
   wherein the receiving, the initiating, and the retrieving are performed prior to transferring the at least one of the one or more certificates to the wireless communication device.

2. The method of claim 1, wherein each of the one or more certificates retrieved at the retrieving has associated therewith at least one status property determinable at the data server and selected from the following group: certificate validity, revocation status, encryption key strength, and trust status.

3. The method of claim 1, wherein for each of the one or more certificates retrieved at the retrieving, the status data determined at the processing for the certificate comprises a plurality of determination results, each associated with one of the at least one status property of the certificate.

4. The method of claim 1, wherein for each of the one or more certificates retrieved at the retrieving,
the status data determined at the processing for the certificate comprises a single determination result derived from determination results associated with the at least one status property of the certificate.

5. The method of claim 1, wherein for each of the at least one certificate for which data comprising certificate data and status data determined at the processing is transmitted at the transmitting,
the at least one status indicator generated by the wireless communication device for the certificate comprises an icon displayable in a plurality of states.

6. The method of claim 1, further comprising:
selecting, prior to the transmitting, the at least one certificate from the one or more certificates retrieved at the retrieving, based on the status data for each of the one or more certificates retrieved at the retrieving as determined at the processing.

7. The method of claim 1, further comprising:
processing each of the one or more certificates retrieved at the retrieving to determine, at the data server, additional certificate data usable by the wireless communication device to determine at least one status property of the certificate at the wireless communication device; and
transmitting the additional certificate data for the at least one of the one or more certificates to the wireless communication device.

8. The method of claim 1, further comprising:
receiving input from the wireless communication device identifying one or more user-selected certificates of the at least one certificate retrieved at the retrieving; and
transferring the one or more user-selected certificates to the wireless communication device.

9. The method of claim 1, further comprising:
maintaining, on the data server, a copy of the at least one certificate stored on the wireless communication device.

10. The method of claim 9, where at least a subset of the at least one certificate stored on the wireless communication device for which a copy is maintained on the data server has been identified as trusted by a user of the wireless communication device.

11. The method of claim 9, further comprising:
for each of the at least one certificate stored on the wireless communication device for which a copy is maintained on the data server,
re-determining the at least one status property of the certificate to determine updated status data for the certificate, and
transmitting the updated status data for the certificate to the wireless communication device.

12. The method of claim 9, further comprising:
for each certificate stored on the wireless communication device for which a copy is maintained on the data server, maintaining a copy of the status data for the certificate as determined at the processing.

13. The method of claim 12, further comprising:
for each of the at least one certificate stored on the wireless communication device for which a copy is maintained on the data server,
re-determining the at least one status property of the certificate to determine updated status data for the certificate,
comparing the updated status data for the certificate to the copy of the status data maintained on the data server for the certificate, and
transmitting the updated status data for the certificate to the wireless communication device if the updated status data for the certificate differs from the copy of the status data maintained on the data server for the certificate.

14. The method of claim 1, wherein the wireless communication device comprises a mobile device.

15. The method of claim 14, wherein the data server comprises a mobile data server.

16. The method of claim 1, wherein at least one of the one or more certificate servers comprises the data server.

17. A non-transitory computer readable storage medium on which a plurality of instructions executable by a processor is stored, the instructions for performing a method of processing certificates located in a certificate search, wherein the method is performed at a data server coupled to a wireless communication device, the method comprising:
receiving a certificate search request from the wireless communication device;
initiating a certificate search on one or more certificate servers, wherein at least one query is submitted to the one or more certificate servers to request retrieval of certificates satisfying the certificate search request;
retrieving one or more certificates from the one or more certificate servers;
for each of the one or more certificates retrieved at the retrieving,
processing the certificate prior to transferring the certificate to the wireless communication device to determine data comprising
certificate data identifying the certificate, and
status data by determining at the data server at least one status property of the certificate;
for at least one of the one or more certificates retrieved at the retrieving,
transmitting data determined at the processing to the wireless communication device prior to transferring the certificate to the wireless communication device;
wherein the certificate data is usable by the wireless communication device to identify each of the at least one certificate in a user interface of the wireless communication device;
wherein the status data determined at the processing is usable by the wireless communication device to generate at least one status indicator that indicates a result of determining at least one status property at the processing, for each of the at least one certificate located by the data server in response to a certificate search initiated by the wireless communication device, for display in the user interface of the wireless communication device prior to user selection of one or more of the at least one certificate for transfer from the data server to the wireless communication device; and
wherein the receiving, the initiating, and the retrieving are performed prior to transferring the at least one of the one or more certificates to the wireless communication device.

18. A system for processing certificates located in a certificate search, the system comprising a wireless communication device and a data server coupled to the wireless communication device, wherein a processor of the data server is configured to:
receive a certificate search request from the wireless communication device;

initiate a certificate search on one or more certificate servers, wherein at least one query is submitted to the one or more certificate servers to request retrieval of certificates satisfying the certificate search request;

retrieve one or more certificates from the one or more certificate servers;

for each of the one or more certificates retrieved,
    process the certificate prior to transferring the certificate to the wireless communication device to determine data comprising
        certificate data identifying the certificate, and
        status data by determining at the data server at least one status property of the certificate;

for at least one of the one or more certificates retrieved, transmit the certificate data and the status data to the wireless communication device prior to transferring the certificate to the wireless communication device;

wherein the certificate data is usable by the wireless communication device to identify each of the at least one certificate in a user interface of the wireless communication device;

wherein the status data is usable by the wireless communication device to generate at least one status indicator that indicates a result of determining the at least one status property, for each of the at least one certificate located by the data server in response to the certificate search initiated by the wireless communication device, for display in the user interface of the wireless communication device prior to user selection of one or more of the at least one certificate for transfer download from the data server to the wireless communication device; and wherein the processor of the data server receives the certificate search request, initiates the certificate search, and retrieves the one or more certificates from the one or more certificate servers prior to transferring the at least one of the one or more certificates to the wireless communication device.

19. A data server configured to process certificates located in a certificate search, wherein a processor of the data server is configured to:

receive a certificate search request from a wireless communication device;

initiate a certificate search on one or more certificate servers, wherein at least one query is submitted to the one or more certificate servers to request retrieval of certificates satisfying the certificate search request;

retrieve one or more certificates from the one or more certificate servers;

for each of the one or more certificates retrieved,
    process the certificate prior to transferring the certificate to the wireless communication device to determine data comprising
        certificate data identifying the certificate, and
        status data by determining at the data server at least one status property of the certificate;

for at least one of the one or more certificates retrieved, transmit the certificate data and the status data to the wireless communication device prior to transferring the certificate to the wireless communication device;

wherein the certificate data is usable by the wireless communication device to identify each of the at least one certificate in a user interface of the wireless communication device;

wherein the status data is usable by the wireless communication device to generate at least one status indicator that indicates a result of determining the at least one status property, for each of the at least one certificate located by the data server in response to the certificate search initiated by the wireless communication device, for display in the user interface of the wireless communication device prior to user selection of one or more of the at least one certificate for transfer from the data server to the wireless communication device; and wherein the processor of the data server receives the certificate search request, initiates the certificate search, and retrieves the one or more certificates from the one or more certificate servers prior to transferring the at least one of the one or more certificates to the wireless communication device.

\* \* \* \* \*